(12) United States Patent
Hudson, III et al.

(10) Patent No.: US 8,479,156 B2
(45) Date of Patent: Jul. 2, 2013

(54) PROVIDING TARGET SPECIFIC INFORMATION FOR TEXTUAL CODE AT EDIT TIME

(75) Inventors: Duncan G. Hudson, III, Austin, TX (US); Rishi H. Gosalia, Austin, TX (US)

(73) Assignee: National Instruments Corporation, Austin, TX (US)

( * ) Notice: Subject to any disclaimer, the term of this patent is extended or adjusted under 35 U.S.C. 154(b) by 784 days.

(21) Appl. No.: 12/487,003

(22) Filed: Jun. 18, 2009

(65) Prior Publication Data

US 2010/0325611 A1    Dec. 23, 2010

(51) Int. Cl.
G06F 9/44        (2006.01)

(52) U.S. Cl.
USPC ............ 717/111; 717/110; 717/112; 717/113

(58) Field of Classification Search
USPC ................. 717/124–135, 141–144, 148, 110, 717/111, 112, 113
See application file for complete search history.

(56) References Cited

U.S. PATENT DOCUMENTS

| | | | |
|---|---|---|---|
| 702,822 A * | 6/1902 | Rosenthal ..................... 242/423 |
| 4,914,568 A | 4/1990 | Kodosky et al. |
| 4,931,928 A * | 6/1990 | Greenfeld ..................... 717/131 |
| 4,989,145 A | 1/1991 | Kyushima |
| 5,210,837 A | 5/1993 | Wiecek |
| 5,237,691 A | 8/1993 | Robinson et al. |
| 5,481,741 A | 1/1996 | McKaskle et al. |
| 5,610,828 A | 3/1997 | Kodosky et al. |
| 5,737,608 A | 4/1998 | Van de Vanter |
| 5,742,828 A | 4/1998 | Canady et al. |
| 5,748,975 A | 5/1998 | Van de Vanter |
| 5,854,929 A * | 12/1998 | Van Praet et al. ............. 717/156 |
| 5,937,190 A * | 8/1999 | Gregory et al. ............... 717/131 |
| 5,999,728 A | 12/1999 | Cable |
| 6,016,467 A | 1/2000 | Newsted et al. |
| 6,064,409 A | 5/2000 | Thomsen et al. |
| 6,091,897 A | 7/2000 | Yates et al. |
| 6,173,438 B1 | 1/2001 | Kodosky et al. |
| 6,182,246 B1 | 1/2001 | Gregory et al. |
| 6,219,628 B1 | 4/2001 | Kodosky et al. |
| 6,282,699 B1 | 8/2001 | Zhang et al. |
| 6,286,017 B1 | 9/2001 | Egilsson |
| 6,314,559 B1 * | 11/2001 | Sollich .......................... 717/111 |
| 6,408,432 B1 * | 6/2002 | Herrmann et al. ............. 717/139 |
| 6,487,713 B1 | 11/2002 | Cohen et al. |
| 6,581,206 B2 | 6/2003 | Chen |

(Continued)

OTHER PUBLICATIONS

"MATLAB: The Language of Technical Computing"; Version 6; The MathWorks; 2002; 1180 pages.

(Continued)

*Primary Examiner* — Phillip H Nguyen
(74) *Attorney, Agent, or Firm* — Meyertons Hood Kivlin Kowert & Goetzel, P.C.; Jeffrey C. Hood; Joel L. Stevens (57) ABSTRACT

Providing target specific information for textual code at edit time. Input specifying textual code or the textual code itself may be received. The textual code may be specified for a target device. The textual code may be analyzed to determine information regarding execution of the textual code on the target device. The information may regard at least one statement of the textual code. The information may be provided for display. The analysis and provision of information may be performed at edit time.

18 Claims, 7 Drawing Sheets

U.S. PATENT DOCUMENTS

| | | | |
|---|---|---|---|
| 6,701,513 B1 | 3/2004 | Bailey | |
| 6,715,139 B1 | 3/2004 | Kodosky et al. | |
| 6,857,118 B2 | 2/2005 | Karr et al. | |
| 7,024,660 B2 | 4/2006 | Andrade et al. | |
| 7,028,222 B2* | 4/2006 | Peterson et al. | 714/38.1 |
| 7,085,670 B2* | 8/2006 | Odom et al. | 702/127 |
| 7,117,490 B2 | 10/2006 | Harrison et al. | |
| 7,152,229 B2* | 12/2006 | Chong et al. | 717/146 |
| 7,171,654 B2* | 1/2007 | Werme et al. | 717/130 |
| 7,188,338 B2* | 3/2007 | Ito | 717/135 |
| 7,296,264 B2* | 11/2007 | Zatloukal et al. | 717/143 |
| 7,302,675 B2 | 11/2007 | Rogers et al. | |
| 7,340,726 B1* | 3/2008 | Chelf et al. | 717/126 |
| 7,954,059 B2* | 5/2011 | Macklem et al. | 715/763 |
| 8,069,373 B2* | 11/2011 | Vorbach | 714/38.1 |
| 8,076,743 B2* | 12/2011 | Choi | 257/432 |
| 2001/0020291 A1 | 9/2001 | Kudukoli et al. | |
| 2003/0192032 A1* | 10/2003 | Andrade et al. | 717/124 |
| 2004/0034847 A1* | 2/2004 | Joffrain et al. | 717/113 |
| 2006/0026559 A1* | 2/2006 | Gunturi et al. | 717/110 |
| 2008/0022259 A1 | 1/2008 | Macklem et al. | |
| 2008/0022264 A1* | 1/2008 | Macklem et al. | 717/136 |
| 2009/0049424 A1 | 2/2009 | Kumar et al. | |
| 2009/0288073 A1* | 11/2009 | Gosalia et al. | 717/141 |
| 2011/0107310 A1* | 5/2011 | Pont et al. | 717/129 |

OTHER PUBLICATIONS

"LabVIEW Tutorial Manual"; Jan. 1996 Edition; National Instruments; pp. 1-29-1-30.

U.S. Appl. No. 12/119,578, entitled "Edit Time Analyzer in a Loosely Typed Textual Language", by Rishi H. Gosalia, Jesse M. Attas, and Bryan A. Marker, filed on May 13, 2008.

"Syntax Highlighting"; Wikipedia; Nov. 1, 2007; Retrieved from Internet: http://web.archive.org/web/20071101101533/http:/en.wikipedia.org/wiki/Syntax_highlighting.

* cited by examiner

PROVIDING TARGET SPECIFIC INFORMATION FOR TEXTUAL CODE AT EDIT TIME

FIELD OF THE INVENTION

The present invention relates to the field of graphical programming, and more particularly to a system and method for compiling a graphical program having a textual language program portion for a real time target.

DESCRIPTION OF THE RELATED ART

The majority of present programming languages are specified in a textual manner, where textual lines of codes specify desired functionality. Even other methods of programming, e.g., graphical programming, have the ability to include or otherwise incorporate textual code into programs. In general, textual code may be specified for general execution, e.g., by a general computer system, or, alternatively, may be specified for execution by a target device, which may be specialized. However, when specifying code targeted for execution by a target device, a programmer must bear in mind various limitations or special abilities of the target device and provide code that is compatible or otherwise desirable for execution by the target device. Correspondingly, improvements in programming are desired.

SUMMARY OF THE INVENTION

Various embodiments are presented of a system and method for providing target specific information for textual code at edit time. The following descriptions may be implemented as one or more computer programs executed by a processor, e.g., where program instructions are stored on a memory medium or as a computer system or device, as desired.

Textual code may be specified for a target device. The textual code may be received or specified, e.g., by a user, and stored in a memory medium. Additionally, the textual code may be dynamically or loosely typed. In some embodiments, the textual code may be included in a graphical program, e.g., in a textual code node of a graphical program. The graphical program may include a plurality of nodes and interconnections between the nodes, which may visually specify the functionality of the graphical program.

Additionally, the target device may be a real time device and/or may include a programmable hardware element, such as a field programmable gate array (FPGA).

The textual code may be analyzed to determine information regarding execution of the textual code on the target device. The information may regard or be specific to at least one statement of the textual code. The information may specify various different features or errors of the textual code. For example, the information may specify syntax information (e.g., which is specific to the target device) of the statement(s) of textual code. Alternatively, or additionally, the information may regard determinism of the statement(s) of textual code when executed by the target device. In one embodiment, the information may indicate one or more memory allocations of the statement(s) of textual code when executed by the target device. In further embodiments, the information may indicate implicit type conversion of a variable of the statement of textual code.

The information may be provided for display. For example, a visual indication may be provided proximate to the at least one statement of textual code. The above described analysis and providing may be performed at edit time.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 11/539,449 titled "Automatic Conversion of Text-Based Code Having Function Overloading and Dynamic Types into a Graphical Program for Compiled Execution," filed Oct. 6, 2006.

U.S. patent application Ser. No. 11/838,387 titled "Type Generic Graphical Programming", filed on Aug. 14, 2007, US Patent Application Publication No. 20090049424.

U.S. Pat. No. 7,302,675, titled "System and Method for Analyzing a Graphical Program Using Debugging Graphical Programs", filed Apr. 10, 2002.

U.S. Pat. No. 7,024,660, titled "Debugging A Program Intended to Execute on a Reconfigurable Device Using a Test Feed-Through Configuration", filed Oct. 29, 2001.

U.S. Pat. No. 6,064,409, titled "System and Method for Providing AudioProbe and Debugging Features in a Graphical Data Flow Program", filed Feb. 14, 1997.

U.S. Pat. No. 6,715,139, titled "System and Method for Providing and Displaying Debugging Information of a Graphical Program on a First Computer During Execution of the Graphical Program on a Second Computer," filed Aug. 3, 2000.

U.S. Pat. No. 7,028,222, titled "Target Device-Specific Syntax and Semantic Analysis For a Graphical Program", filed Jun. 21, 2002.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Dynamically Typed—a program (or program portion) having variables, wherein types of the variables in the program were not specified by the user at edit time. Thus types of the variables in the program are not necessarily known prior to compile time (or possibly run time).

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Real Time Application—may refer to software program(s) that are subject to real time constraints, e.g. operational deadlines from event to system response. For example, the real time application may execute a real time loop that iterates, e.g., once every 1 millisecond. Within each iteration of the loop, the code typically executes to read input data sources (events), perform calculations on those inputs, and write the resulting output data (system response). Since the loop executes under tight timing constraints, it is desirable to read the input data sources as quickly as possible.

Figure 1A:
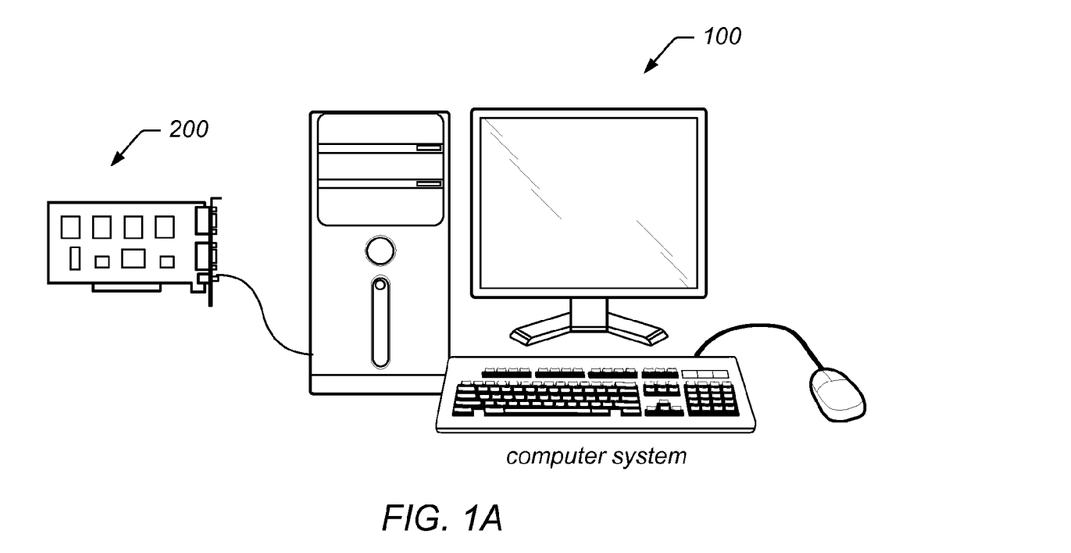
FIGS. 1A and 1B illustrates a computer system coupled to a target device, according to an embodiment.
Figure 1B:
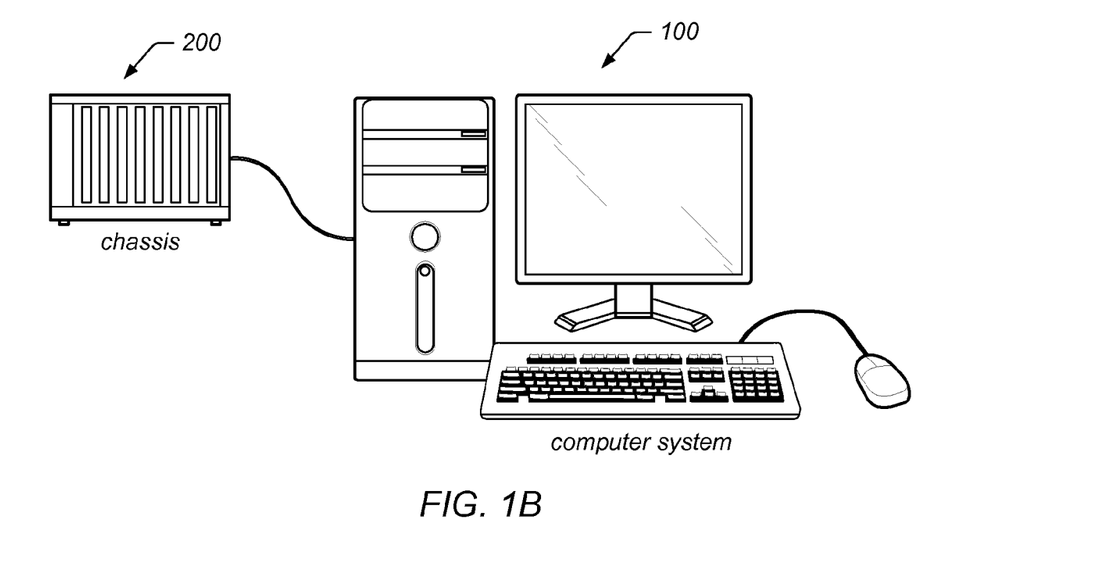

FIGS. 1A and 1B—Exemplary System Including a Target Device

FIGS. 1A and 1B illustrate embodiments of a system including target device (e.g., a real time target device or embedded device) which may execute programs. As shown in FIG. 1A, the system may include a computer system 100 coupled, e.g., through a network, (or other transmission medium) to the target device 200. In other embodiments, the computer system 100 may be coupled to the target device 200 via an intermediate hub, which may communicate with the computer system 100 over a network, and which may communicate with the target device 200 via wired or wireless means.

The computer system 100 may be any of various types of computer systems. Computer system 100 may include a processor, a memory medium, as well as other components as may typically be found in a computer system. The memory medium of the computer system may store a program development environment for creating programs. As used herein, the term program is intended to include text-based or graphical instructions which are executable, compilable, and/or interpretable by a processor or programmable hardware element (such as a Field Programmable Gate Array (FPGA)) to perform a specified function or functions.

In one embodiment, the program development environment may be a textual program development environment or may be a graphical program development environment for creating graphical programs which include textual code, e.g., in a textual code node. An exemplary graphical program development environment is the LabVIEW™ development environment offered by National Instruments Corporation. Another exemplary graphical program development environment is the SIMULINK™ development environment offered by The MATHWORKS™. A user may create a program on a computer system, and computer system 100 may provide the program to target device 200, optionally via a hub device.

Target device 200 may include a processor and memory medium for executing programs. In one embodiment, the target device 200 executes programs received from the computer system over a network. In another embodiment, the computer system 100 sends the program to a hub device over a network, and the hub device operates to deploy the programs to the target device 200, e.g., in a wireless fashion, and the program executes on target device 200 in real time. It should be noted that in various embodiments, the target device 200 may be implemented as a card in a computer system (e.g., as shown in FIG. 1A) or in different devices, such as, for example, a device with an ARM processor, as described below, a PXI chassis which includes an embedded device card (as shown in FIG. 1B), or any other processor based device suitable for embedded systems. One exemplary target device 200 is a smart sensor (e.g., a smart camera).

In one embodiment, the target device 200 may include a programmable hardware element, such as an FPGA. The target device 200 may be operable to receive a hardware configuration file, e.g., a netlist, which encodes a desired functionality, and to deploy the hardware configuration file to the FPGA, thereby configuring the FPGA to perform the desired functionality.

Target device 200 may be connected to computer system 100 by a network. The network may be comprised of any of the various types of networks including local area networks (LAN), wide area networks (WAN), etc. One example of a wide area network is the Internet. Target device 200 may also connect to computer system 100 through other communication mediums, such as a serial bus, e.g., USB or IEEE 1394, a parallel bus, PCI, PCI Express, or through wireless means. The wireless communication mechanism may comprise any of various types of wireless transmission, including Blue Tooth, IEEE 802.11 (wireless Ethernet), RF communication, and other types of wireless communications, such as, for example, communication via satellite, and cell towers, such as used for cellular telephone communication, among others. In various embodiments, the target device 200 may include or may be coupled to one or more sensors or actuators. For example, the target device 200 may include a radio and may be coupled to a sensor via wireless means. In one embodiment, one or more of the sensors coupled to the target device 200 may be smart sensors, i.e., may include a processor and memory (and/or a programmable hardware element, such as an FPGA), and therefore may be operable to execute program code and/or receive commands from the target device 200 as a result of execution of the program code.

Embedded Devices

As mentioned above, in various embodiments of the present invention, the target device 200 may be a real time or embedded device which is coupled to the host computer 200. As used herein, the term "real time device" has its ordinary accepted meaning, and refers to a (typically small) platform which includes dedicated hardware and/or software (such as a real time operating system) that is designed to provide real time or deterministic performance. A "real time device" generally includes a processor and memory (or FPGA) on which may be installed dedicated programs or software. The real time device includes a real time operating system or other software designed to ensure deterministic behavior, and is configured to execute such programs or software in real time. A real time device is typically designed to perform a defined task very well, and generally does not include display capabilities or user interface software. In particular, a real time device is typically not a device with general purpose capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. An example of a real time device is an Internet remote camera, with dedicated hardware and software that implements the following tasks:

it acquires images from the optical device, it compresses these images as GIF or JPEG files, or perhaps as MPEG streams, and it sends the images to a host computer upon request, using TCP/IP, HTTP, or multimedia streams.

Other examples of real time devices include a measurement device with a specific type of measurement hardware and/or software for taking certain measurements, a control measurement device with a specific type of hardware and/or software for performing certain control operations, etc.

The end user does not care about how these tasks are implemented, but only wants a device that operates in real time, and normally, in a deterministic manner. Real time systems are often used as building blocks for more complicated applications. Thus, a real time device generally includes both hardware and software. Additionally, real time devices are generally built around a specialized hardware component, which is the "reason to exist" for these devices (like the camera in the above example). Other typical components include: a processor, such as an ARM processor, RAM and ROM memory, a storage medium, a display, one or more communication devices, and power and over-voltage protection components. Generally, flash memory is used for data storage in addition to RAM.

Figure 2:
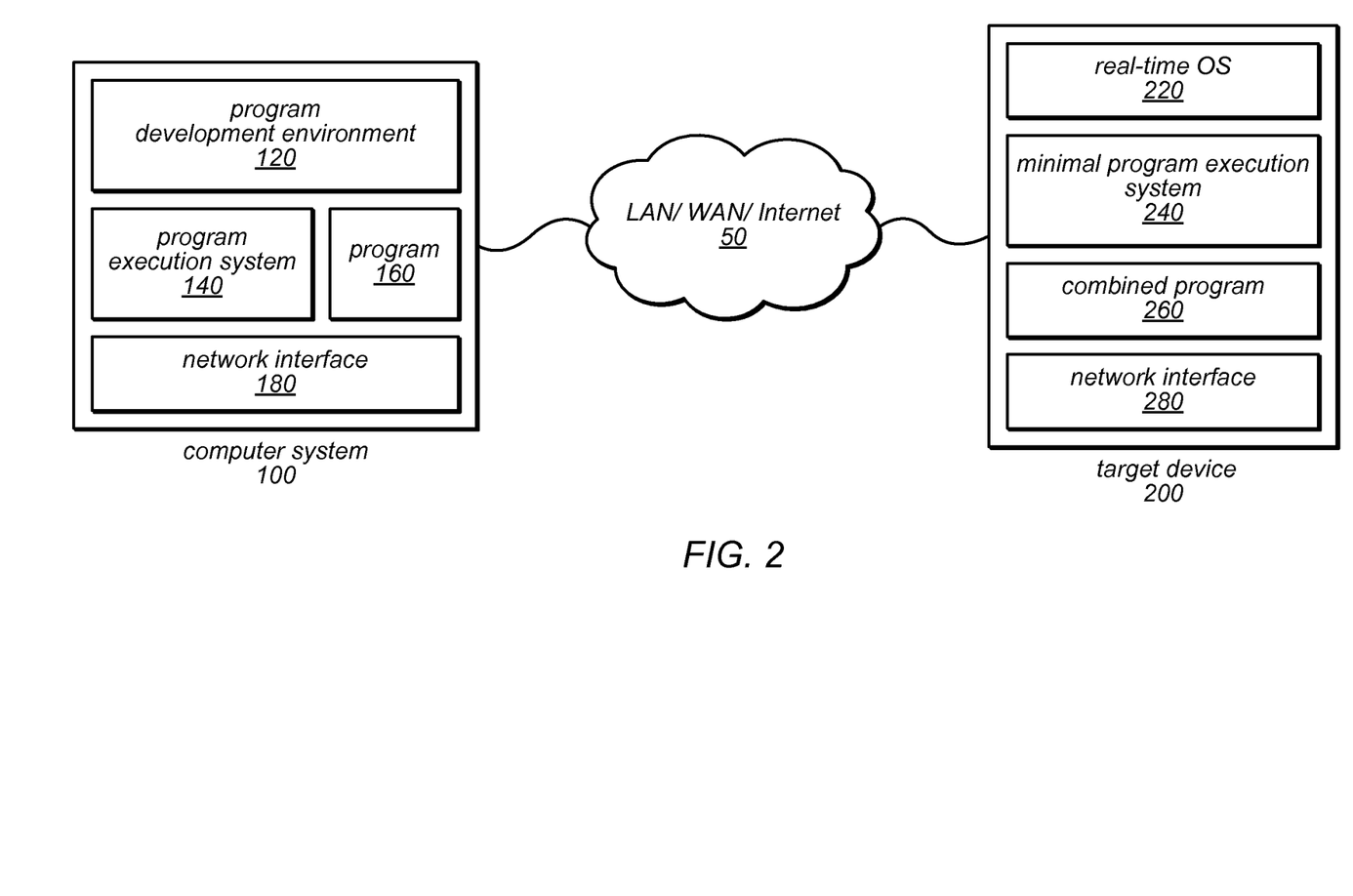
FIG. 2 is an exemplary block diagram of the system of FIGS. 1A and 1B, according to an embodiment.

FIG. 2—Block Diagram of the Exemplary System

FIG. 2 is a block diagram of the exemplary system of FIGS. 1A and 1B, according to one embodiment. In the embodiment shown in FIG. 2, the computer system 100 includes a development environment 120, which facilitates development of programs for implementing desired functions or operations, as well as a program execution system 140, also referred to as the execution system 140. The execution system 140 may be operable to execute programs developed with the program development environment 120 (or other program development environments).

As used herein, the term "execution system" may include at least one software program that is designed to execute a certain class of programs. For example, LabVIEW programs utilize an execution system (a LabVIEW graphical program execution engine) that executes in a system in order to execute LabVIEW graphical programs.

The execution system 140 may include a componentized or modular architecture, e.g., a componentized callback system, stored on the computer system for partial transfer to an external device, e.g., the target device 200. In other words, the functions of the execution system 140 may be organized into modular components which may be operable to be transferred entirely or in part to the target device 200 to facilitate execution of programs on the target device 200. In many of the embodiments described herein, the systems and methods are described in terms of textual programs, although it should be noted that the invention is broadly applicable to other types of programs as well, e.g., graphical programs, statecharts, simulation diagrams, etc., which may include textual code or textual program portions.

As FIG. 2 also shows, the computer system 100 may also store one or more programs 160 which are executable via the execution system 140 (or portions thereof) to perform specified functions or operations, as desired. In the embodiment shown, the program 160 may be stored for transferal to the target device 200 for execution. As will also be described in more detail below, various components of the execution system 140 may be combined with respective portions of the program 160 for transferal to the target device 200 for execution. The computer system 100 may also include a network interface 180 for communicating over a network with devices on the network 50. For example, the network interface 180 may be an Ethernet interface for communicating over the Internet.

In an alternate embodiment, the program 160 may be provided from a first computer, and components of the execution system 140 necessary for execution of this program may be provided from a second different computer system.

In the embodiment of FIG. 2, the target device 200 includes an operating system 220, e.g., a real-time operating system (OS), for managing program execution, managing device resources, and communications in real time devices, as is well known in the art. Examples of real-time operating systems 220 include, but are not limited to, Linux, NetBSD, vxWorks, eCos, and Windows CE. Due to size and performance issues, the eCos real-time operating system may be particularly suitable for use in the target device 200, although other real-time operating systems are also contemplated. The target device 200 may also include a target execution system (or "minimal execution system") 240, which may be a minimal embedded graphical program execution system, and which may include a subset of the execution system 140 stored on the computer system 100, mentioned above. The minimal execution system 240 may be optimized to minimize the memory footprint on the target device 200. In one embodiment, the minimal execution system 240 may comprise an execution system virtual machine.

The minimal execution system 240 may facilitate execution of program(s) 160 by the target device 200. More specifically, the program 160 stored on the computer system 100 may be combined with one or more components of the componentized callback system of execution system 140 to generate a flatfile which may be transferred to the target device 200, e.g., over the network 50 via the network interface 280 of real time target 200. The flatfile may be directly executable by the target device 200. Alternatively, the flatfile may be used in constructing a combined program 260 on the target device 200, wherein the combined program 260 may be executed on the target device 200. The target embedded device 200 may also include software for performing various functions, such as a program linker/loader, which in various embodiments may be comprised in the real time OS, the minimal execution system 240, or may be stored and executed as a separate program.

Figure 3A:
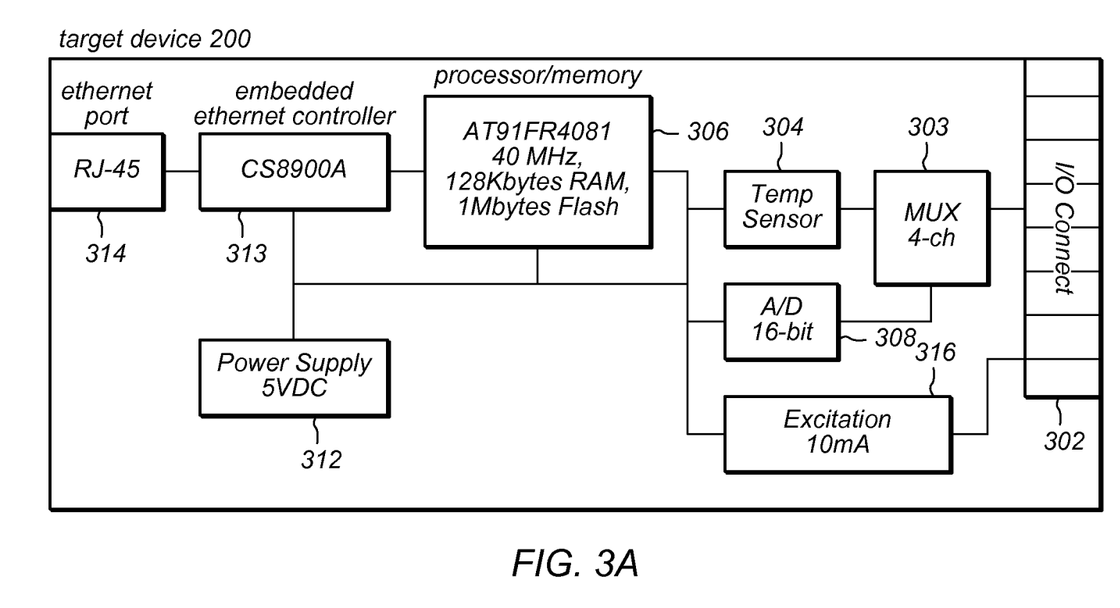
FIGS. 3A-3C are exemplary block diagrams of the target device, according to an embodiment.
Figure 3B:
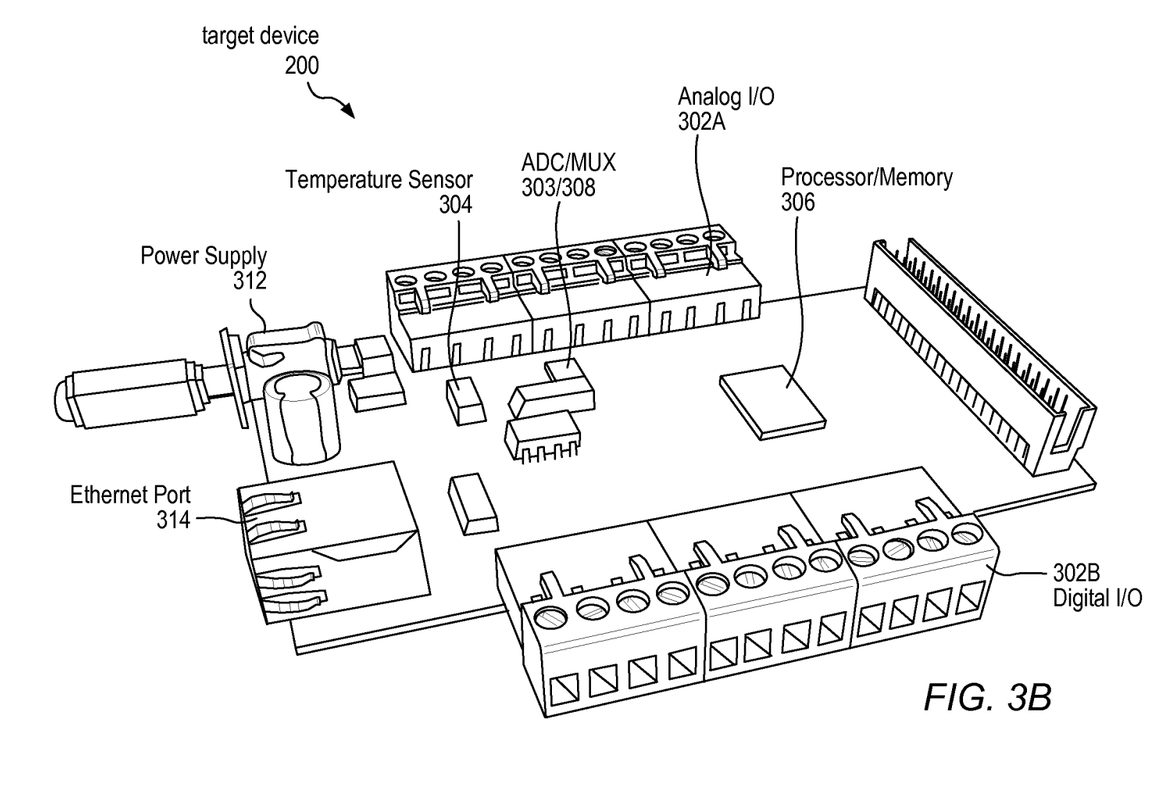
Figure 3C:
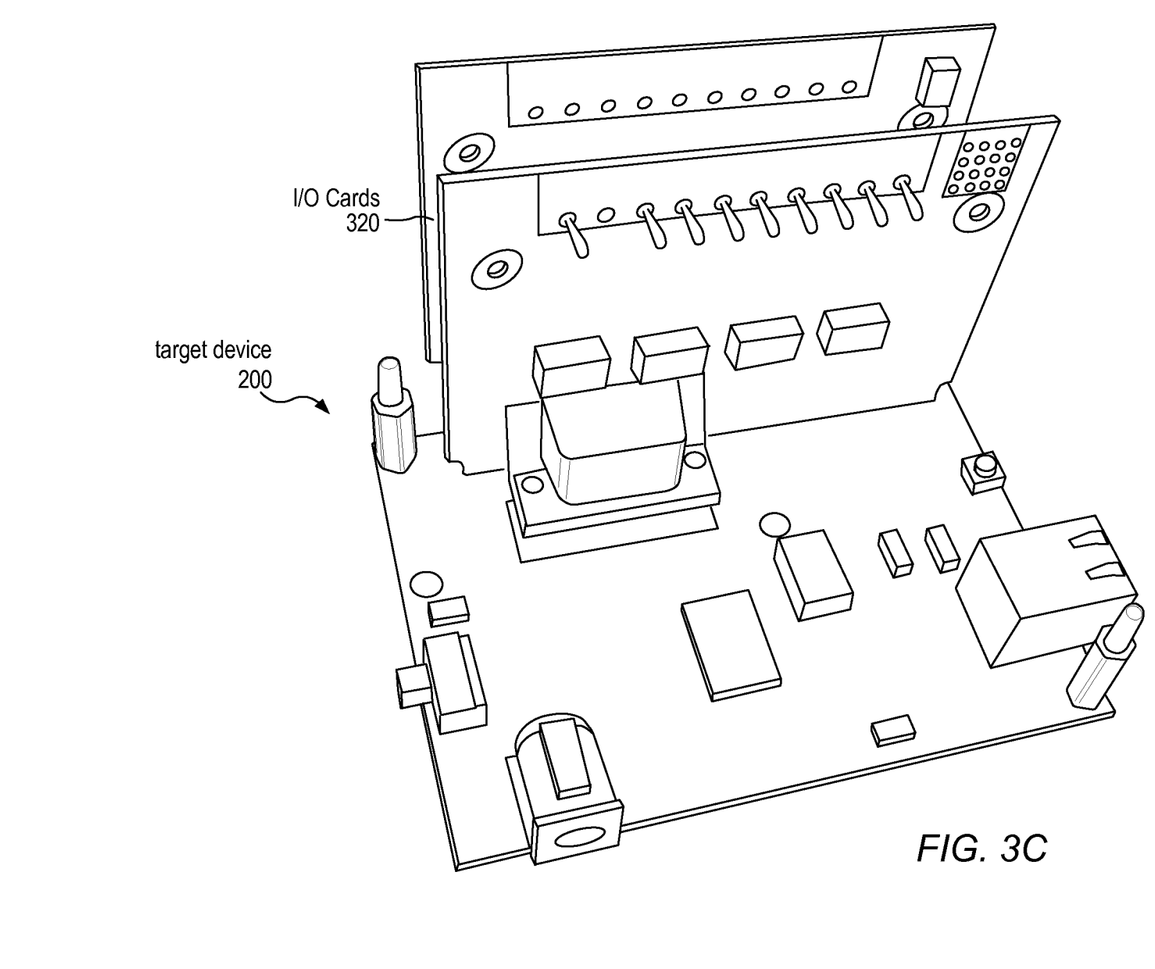

FIGS. 3A-3C—Embedded Device Hardware Configuration

FIG. 3A illustrates a hardware configuration of one embodiment of the target device 200, as shown in FIGS. 1A, 1B, and 2. It should be noted that the embodiment shown is intended to be exemplary only, and is not meant to limit the target device 200 to any particular architecture, components, size, or form.

In the embodiment shown in FIG. 3A, the target device 200 may include an I/O connector 302 coupled to a 4-channel multiplexer (MUX) 303, connected to a 4-channel 16-bit ADC 308, a temperature sensor 304, a micro-controller with internal flash program memory and data SRAM 306, and Ethernet port 314 (e.g., controlled by embedded Ethernet controller 313). In this embodiment, power is provided by a 5 volt DC power supply 312. The processor 306, an ATMEL ARM Thumb AT91FR4081, may have a high-performance 32-bit RISC architecture with high-density 16-bit instruction set and very low power consumption. By combining the micro-controller, featuring 136 Kbytes on on-chip SRAM and a wide range of peripheral functions, with 8 Mbits of Flash memory in a single compact 120-ball BGA package, the Atmel AT91FR4081 306 provides a powerful, flexible, and cost-effective solution to the minimal embedded control application. Significant board size reduction is also noted as a benefit.

FIG. 3B illustrates the embedded hardware of FIG. 3A, according to one embodiment. As FIG. 3B shows, the hardware components included in the target embedded device 200 facilitate an extremely compact form factor. Additionally, the I/O 302 may be separated as Analog I/O 302A and Digital I/O 302B, according to some embodiments.

FIG. 3C illustrates another embodiment of the embedded target device 200, according to one embodiment. As FIG. 3C shows, in this embodiment, substantially all of the functionality included on the board may be modular. For example, different I/O boards 320 may be selected and plugged-in depending on the type of sensors required by the application. In this embodiment, components which may be provided by additional modules (e.g., cards) have been remove, such as the temperature sensor 304 and the ADC 308. In this embodiment, a micro-controller with internal 1 MB of flash program memory and 128 kb of data SRAM is connected via SPI (serial peripheral interface) to an analog small form-factor DAQ slot, and is further connected via a digital bus to a digital small form-factor DAQ slot. This embodiment may be particularly suited for smart sensing, computing, and control, due to the design emphasis on modularity.

In all of the embodiments shown above, it is noted that only necessary acquisition and processing code may be packaged and downloaded onto the embedded device (using the combined program or flatfile).

Figure 4:
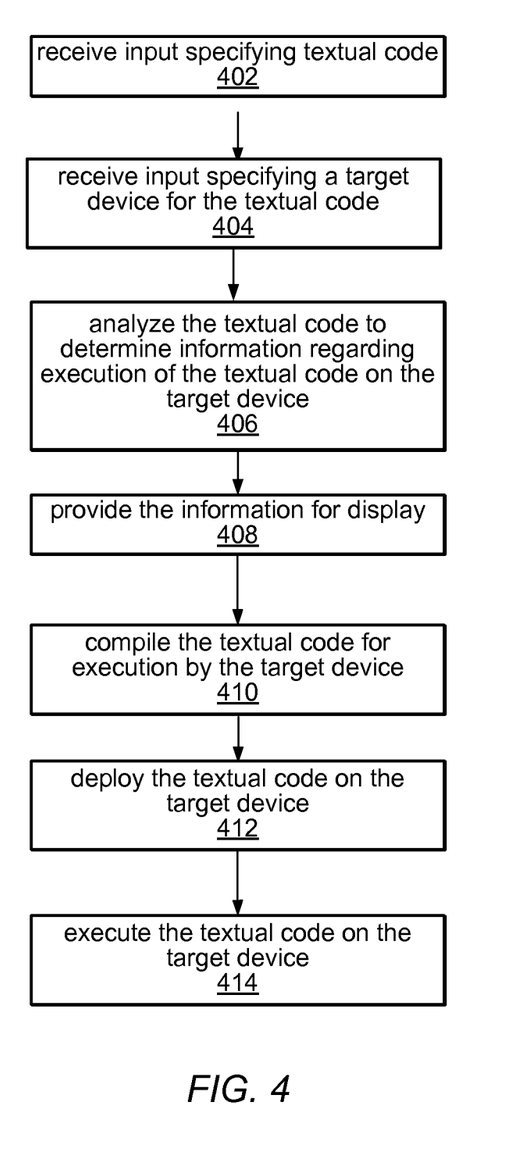
FIG. 4 is a flowchart diagram illustrating one embodiment of a method for providing information regarding execution of textual code on a target device.

FIG. 4—Providing Information Regarding Execution of Textual Code on a Target Device FIG. 4 illustrates a method for providing information regarding execution of textual code on a target device. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, textual code may be received or otherwise stored on the computer system 100 (or on a different computer system).

The textual code may be specified, e.g., based on input, such as user input. For example, the user may provide input to the computer system to manually specify the textual code. The textual code (or textual language program portion) may be specified in a loosely or dynamically typed programming language. Thus, the textual language program may not explicitly define data types of variables in the code of the textual language program portion. In various embodiments, the user may specify the textual language program portion by manually entering the code, automatically generating the code from user specification, and/or importing existing code from other sources (e.g., already existing m-files).

Figure 5A:
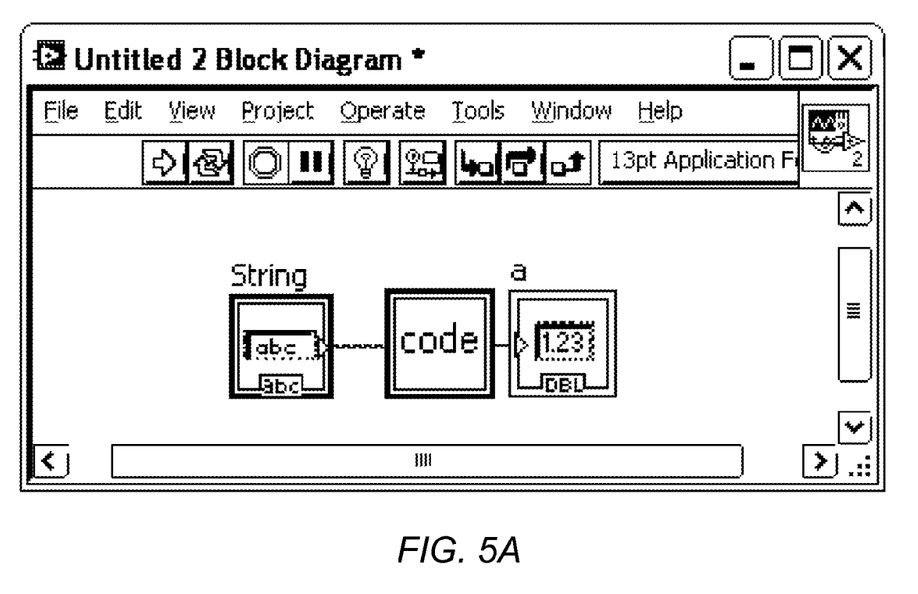
FIGS. 5A and 5B are exemplary graphical programs including textual program portions, according to an embodiment.
Figure 5B:
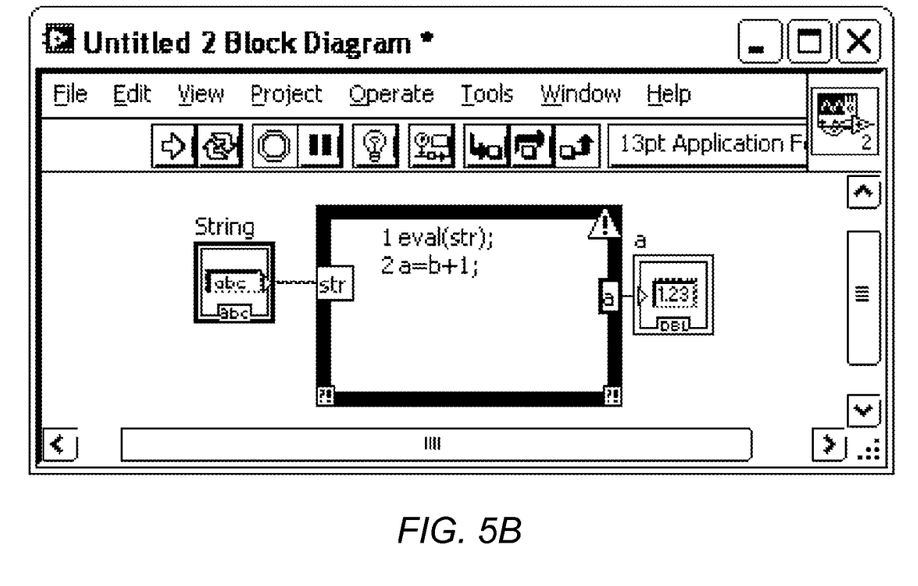

In some embodiments, the textual code may be specified as part of a graphical program, e.g., comprised in one or more textual nodes of the graphical program. FIGS. 5A and 5B illustrate simple graphical programs which include textual program portions. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In 404, input may be received specifying a target device. Thus, the textual code may be specified for a specific target device, such as the target device 200 described above. In one embodiment, the user may be able to choose from a plurality of different target devices, e.g., using a graphical user interface (GUI). For example, the user may be able to choose a target device coupled to his computer system, or it may be chosen automatically, as desired. As already indicated, the target may be a real time target device and/or may include a programmable hardware element. The program may implement a measurement function that is desired to be performed by the target device.

In 406, the textual code may be analyzed to determine information regarding execution of the textual code on the target device. In various embodiments, the analysis may include analyzing each line of code or statement of the textual code, determining functions referenced by the textual code, etc. In one embodiment, the analysis may include analyzing variables used in the textual code, e.g., to determine types, memory allocations, determinism, hardware or software resource utilization, memory cache hierarchy usage, thread usage, etc. Note that various embodiments of the present method may be similar to those described in U.S. Pat. No. 7,028,222, which was incorporated by reference in its entirety above. However, the method may be modified so as to apply to textual code as well as the graphical programs described therein.

According to various embodiments, the information may be specific to a line or a plurality of lines of code in the textual code, or may relate to the textual code in general. As one example, the information may specify syntax information of one or more statements or lines of the textual code. The syntax information may be specific to the target device. For example, the information may indicate that a function (or the specified syntax of the function) is not compatible with the target device. As one specific example, a VxWorks based target device may not support certain digital filter design toolkit based functions. Accordingly, the information may indicate that such statements are not compatible or are not supported by the target device. Thus, the information may be specific to the target device for the textual code and may be specific to particular statements or lines of code in the textual code.

The information may also indicate whether or not the textual program (or specific functions or statements of the textual program) will execute in a deterministic manner on the target device. For example, a program that performs dynamic memory allocation at run-time may have a highly variable execution time on each execution, resulting in the inability to consistently satisfy its real-time timing requirements. Thus, the information may relate to deterministic execution of the textual code (or a portion thereof) on the target device.

In further embodiments, the information may indicate one or more memory allocations of the textual code. For example, the information may indicate to a user when memory will be allocated (and possibly how it will be allocated) by the target device upon execution. Accordingly, the user may be provided with feedback, at edit time, as to how and when new memory allocations will occur during run time.

The information may also indicate implicit type conversion of a variable in the textual code. The following provides an exemplary portion of code which would result in type conversion. In this case, a in line 2 is converted from 132 to 1D array of 132.

```
if condition    %line 1
    a=1;        %line 2
else            %line 3
    a=[1 2 3];  %line 4
end %
```

Thus, the information may also specify information about the textual code in general, e.g., in addition to information that is specific to the target device.

In some embodiments, the information may include edit-time suggestions to avoid type conversions and non-deterministic behavior. Example: out=eig(a,b). Call to eig function with scalar inputs a and b will cause memory allocation. In such a situation, the information may suggest to pass arguments to eig function as vectors instead, since that modification will not cause memory allocation.

In 408, the information may be provided for display. In some embodiments, the information may be provided as graphical indications, e.g., next to corresponding statement(s) of the textual code. For example, where the information indicates syntax information of the textual code for the target device, an icon may be displayed next to the statements or lines of code to which the information applied. As one specific example, a warning glyph icon (perhaps indicating the specific target device) may be displayed next to lines of code that are not supported by the selected target device. Other icons or visual indications may be used for other examples, e.g., for determinism of the execution of the target device, indications of memory allocations (e.g., displaying dots, or memory allocation icons), for implicit type conversions, etc. As another example, the information may include suggestions for completing the text that a user is typing. Thus, the information may finish typing the name of the function (or other variable name, data structure, etc.) to ensure determinism, no memory allocations, etc. Thus, once the textual code is analyzed and information pertaining to the target device and the target code is generated in 406, the information may be provided for display in 408.

As indicated above, the analysis and provision of the information may be performed during edit time of the textual code, e.g., in a dynamic manner. In other words, the analysis and provision of information described above may be performed at edit time on code that has not been compiled. Thus, instead of requiring the user to invoke a compilation process, the user may receive instant feedback while editing or specifying the textual code. In some embodiments, the analysis may be performed in an iterative fashion, e.g., in a periodic fashion, or dynamically, e.g., each time code is added or modified. For example, the analysis and display may be performed each time the user adds a textual program statement or edits an existing program statement.

Additionally, the analysis and provision of the information may be re-performed each time the user specifies a new target device. Thus, when the user changes a target or otherwise specifies a new target device, the analysis may be performed for that target device and new information may be provided for display to the user.

In 410, the textual code may be compiled for deployment on the target device. Compiling the textual code may include compiling the textual code for real time execution, e.g., where the target device is a real time target. In various embodiments, the textual code may need to be modified (or optimized) in the compiling process such that the textual code can execute in the desired manner. In some embodiments, the modifications may fix any of the syntax errors or deterministic warnings described above, e.g., in an automatic fashion. Thus, in some embodiments, the compilation process may fix any errors which the compiler is able to resolve without manual intervention by the user, as is typical in prior art systems.

Compiling the textual code may include inferring strict types. For example, in one embodiment, as indicated above, the textual program portion may be written in a loosely typed or dynamically typed textual language. Thus, the types of variables in the textual program portion may not be known based on the code of the textual program portion. In such embodiments, compiling the textual code may include inferring strict types for the textual language program portion. Inferring strict types for the textual language program portion may include using generic data types for variables in the textual language program portion and then inferring the data types of each variable, e.g., using type propagation of the textual program portion. However, it should be noted that such determinations may be performed at edit time, e.g., to determine and/or provide the information for display.

Compiling the textual code may include generating a hardware description file for a programmable hardware element (e.g., a field programmable gate array (FPGA)) comprised in the target device. The hardware description may at least include functionality described or specified by the textual code. For example, compiling the textual code may include generating a netlist for configuring the programmable hardware element.

In 412, at least a portion of the textual code (e.g., within a graphical program) may be deployed to the target device. According to various embodiments, deploying the textual code to the target device may include configuring a programmable hardware element included in the target device, deploying a real time execution engine on the target device, and/or any of the actions or methods described above, e.g., regarding FIGS. 3A-3C.

In 414, the textual code may be executed at least in part by the target device. In various embodiments, the target device may communicate with various devices (e.g., computer systems, sensors, devices, etc.) to perform functionality specified by the textual code. In various embodiments, the target device may execute with one or more other devices to provide execution of the textual code in a distributed manner. For example, portions of the textual code may execute on the target device while other portions may execute on a desktop computer.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing program instructions executable by one or more processors to:
   receive user input adding textual code to a program during editing of the program, wherein the textual code is specified for a real-time target device;
   in response to receiving the user input adding the textual code:
      analyze the textual code to determine whether the textual code has a deterministic execution time on the real-time target device; and
      display information indicating that the execution time of the textual code on the real-time target device is non-deterministic;
   wherein said analyzing and said displaying are performed during the editing of the program to provide feedback responsive to the addition of the textual code.

2. The memory medium of claim 1, wherein the program instructions are further executable by the one or more processors to:
   in response to receiving the user input adding the textual code:
      analyze syntax information of at least one statement of the textual code, wherein the syntax information is specific to the real-time target device; and
      display an indication that the syntax information is not compatible with the real-time target device, wherein said displaying the indication comprises displaying the indication during the editing of the program to provide the indication responsive to the addition of the textual code.

3. The memory medium of claim 1, wherein the program instructions are further executable by the one or more processors to:
   in response to receiving the user input adding the textual code:
      analyze the textual code to determine whether the textual code performs one or more memory allocations when executed by the real-time target device; and
      display information indicating that the textual code performs one or more memory allocations when executed by the real-time target device, wherein said displaying the information comprises displaying the information during the editing of the program to provide the information responsive to the addition of the textual code.

4. The memory medium of claim 1, wherein the program instructions are further executable by the one or more processors to:
   in response to receiving the user input adding the textual code:

analyze the textual code to determine that the textual code performs a data type conversion; and display a suggestion for avoiding the data type conversion performed by the textual code, wherein said displaying the suggestion comprises displaying the suggestion during the editing of the program to provide the suggestion responsive to the addition of the textual code.

5. The memory medium of claim 1, wherein the textual code is textual code of a dynamically typed programming language.

6. The memory medium of claim 1, wherein the textual code is comprised in a graphical program, wherein the graphical program comprises a plurality of nodes and interconnections between the nodes, and wherein the plurality of nodes and interconnections between the nodes visually specifies functionality of the graphical program.

7. The memory medium of claim 1, wherein said displaying the information comprises displaying a visual indication proximate to at least one statement of the textual code.

8. The memory medium of claim 1, wherein the real-time target device comprises a programmable hardware element.

9. A method, comprising:
a computer system receiving user input adding textual code to a program during editing of the program, wherein the textual code is specified for a real-time target device;
in response to receiving the user input adding the textual code:
the computer system analyzing the textual code to determine whether the textual code has a deterministic execution time on the real-time target device; and
the computer system displaying information on a display device indicating that the execution time of the textual code on the real-time target device is non-deterministic;
wherein said analyzing and said displaying are performed by the computer system during the editing of the program to provide feedback responsive to the addition of the textual code.

10. The method of claim 9, further comprising:
in response to receiving the user input adding the textual code:
the computer system analyzing syntax information of at least one statement of the textual code, wherein the syntax information is specific to the real-time target device; and
the computer system displaying an indication that the syntax information is not compatible with the real-time target device, wherein said displaying the indication comprises displaying the indication during the editing of the program to provide the indication responsive to the addition of the textual code.

11. The method of claim 9, further comprising:
in response to receiving the user input adding the textual code:
the computer system analyzing the textual code to determine whether the textual code performs one or more memory allocations when executed by the real-time target device; and
the computer system displaying information indicating that the textual code performs one or more memory allocations when executed by the real-time target device, wherein said displaying the information comprises displaying the information during the editing of the program to provide the information responsive to the addition of the textual code.

12. The method of claim 9, further comprising:
in response to receiving the user input adding the textual code:
the computer system analyzing the textual code to determine that the textual code performs a data type conversion; and
the computer system displaying a suggestion for avoiding the data type conversion, wherein said displaying the suggestion comprises displaying the suggestion during the editing of the program to provide the suggestion responsive to the addition of the textual code.

13. The method of claim 9, wherein the textual code is textual code of a dynamically typed programming language.

14. The method of claim 9, wherein the textual code is comprised in a graphical program, wherein the graphical program comprises a plurality of nodes and interconnections between the nodes, and wherein the plurality of nodes and interconnections between the nodes visually specifies functionality of the graphical program.

15. The method of claim 9, wherein said displaying the information comprises displaying a visual indication proximate to at least one statement of the textual code.

16. The method of claim 9, wherein the real-time target device comprises a programmable hardware element.

17. A system, comprising:
one or more processors;
a display coupled to the one or more processors; and
a memory medium coupled to the one or more processors, wherein the memory medium stores program instructions executable by the one or more processors to:
receive user input adding textual code to a program during editing of the program, wherein the textual code is specified for a real-time target device;
in response to receiving the user input adding the textual code:
analyze the textual code to determine whether the textual code has a deterministic execution time on the real-time target device; and
display information indicating that the execution time of the textual code on the real-time target device is non-deterministic;
wherein said analyzing and said displaying are performed during the editing of the program to provide feedback responsive to the addition of the textual code.

18. The memory medium of claim 1, wherein the program instructions are further executable by the one or more processors to:
in response to receiving the user input adding the textual code:
analyze the textual code to determine that the textual code performs a data type conversion; and
display a suggestion for avoiding the data type conversion performed by the textual code;
wherein said displaying the suggestion comprises displaying the suggestion during the editing of the program to provide the suggestion responsive to the addition of the textual code.

* * * * *